United States Patent
Katougi et al.

[11] Patent Number: 6,118,549
[45] Date of Patent: Sep. 12, 2000

[54] COLOR CONVERSION DEVICE

[75] Inventors: Terumitsu Katougi, Chiba; Toshio Nomura, Ichihara, both of Japan

[73] Assignee: Sharp Kabushiki Kaisha, Osaka, Japan

[21] Appl. No.: 09/044,261

[22] Filed: Mar. 19, 1998

[30] Foreign Application Priority Data

Mar. 26, 1997 [JP] Japan ................................. 9-072524
Feb. 4, 1998 [JP] Japan ............................... 10-023036

[51] Int. Cl.[7] .................................................. G06F 15/00
[52] U.S. Cl. ..................... 358/1.9; 358/515; 358/520; 358/522; 358/525; 382/167
[58] Field of Search .......................... 395/109; 358/500, 358/515, 518, 523, 525, 1.9, 519, 522, 530, 536; 382/167, 276

[56] References Cited

U.S. PATENT DOCUMENTS

| | | |
|---|---|---|
| 4,929,978 | 5/1990 | Kanamori et al. . |
| 5,233,412 | 8/1993 | Nishihara ............................. 358/515 |
| 5,268,754 | 12/1993 | Van De Capelle et al. ............ 358/527 |
| 5,311,332 | 5/1994 | Imao et al. . |
| 5,519,515 | 5/1996 | Komatsu ............................. 358/518 |

FOREIGN PATENT DOCUMENTS

| | | |
|---|---|---|
| 0481525 | 4/1992 | European Pat. Off. . |
| 0550243 | 7/1993 | European Pat. Off. . |
| 0706287 | 4/1996 | European Pat. Off. . |
| 63-162248 | 7/1988 | Japan . |
| WO9608918 | 3/1996 | WIPO . |

*Primary Examiner*—Edward L. Coles
*Assistant Examiner*—Mark Wallerson

[57] ABSTRACT

A color conversion device includes a region judging section for judging which region of a three-dimensional color space contains an input value, and/or a representative points-dispersed axis selecting section for selecting a representative points-dispersed axis which is nearest to said input value. Additionally, the color conversion device includes a representative points selecting section for selecting representative points in the vicinity of the input value among representative points discretely arranged along (or within) the selected representative points dispersed axis; a look-up table (LUT) which stores coordinates of representative points and color correction data; and a linear interpolation section for performing color conversion by weighting based on the selected representative points.

39 Claims, 19 Drawing Sheets

FIG. 4

| Coordinates value | Color correction data |
|---|---|
| On the C axis | |
| P11 (C11, 0, 0) → | P'11 (C'11, M'11, Y'11) |
| P12 (C12, 0, 0) → | P'12 (C'12, M'12, Y'12) |
| P13 (C13, 0, 0) → | P'13 (C'13, M'13, Y'13) |
| . | |
| . | |
| On the M axis | |
| P21 (0, M21, 0) → | P'21 (C'21, M'21, Y'21) |
| P22 (0, M22, 0) → | P'22 (C'22, M'22, Y'22) |
| P23 (0, M23, 0) → | P'23 (C'23, M'23, Y'23) |
| . | |
| . | |
| On the Y axis | |
| P31 (0, 0, Y31) → | P'31 (C'31, M'31, Y'31) |
| P32 (0, 0, Y32) → | P'32 (C'32, M'32, Y'32) |
| P33 (0, 0, Y33) → | P'33 (C'33, M'33, Y'33) |
| . | |
| . | |
| On the C=M=Y axis | |
| P40 ( 0, 0, 0 ) → | P'40 (C'40, M'40, Y'40) |
| P41 (C41, M41, Y41) → | P'41 (C'41, M'41, Y'41) |
| P42 (C42, M42, Y42) → | P'42 (C'42, M'42, Y'42) |
| P43 (C43, M43, Y43) → | P'43 (C'43, M'43, Y'43) |
| . | |
| . | |

FIG.5A
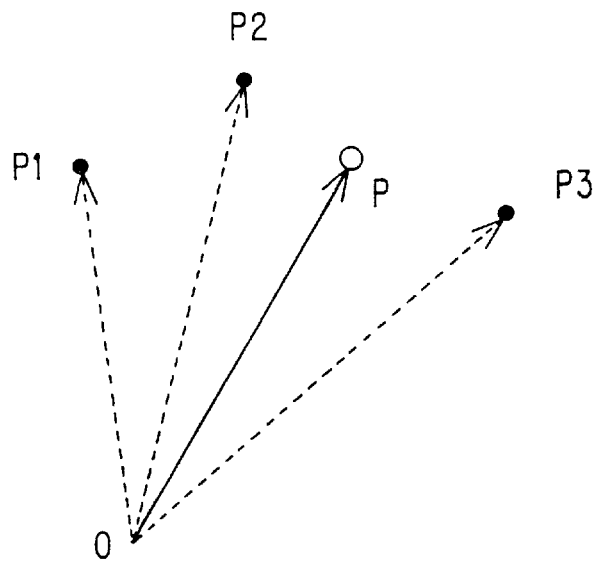
FIG.5B
| Coordinates value | | Color correction data |
|---|---|---|
| P1 (C1,M1,Y1) | → | P'1 (C'1,M'1,Y'1) |
| P2 (C2,M2,Y2) | → | P'2 (C'2,M'2,Y'2) |
| P3 (C3,M3,Y3) | → | P'3 (C'3,M'3,Y'3) |
FIG.6
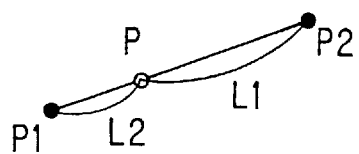

FIG. 8

| Coordinates value | Color correction data |
|---|---|
| On the C axis | |
| P11 (C11, 0, 0) → | P'11 (C'11, M'11, Y'11) |
| P12 (C12, 0, 0) → | P'12 (C'12, M'12, Y'12) |
| P13 (C13, 0, 0) → | P'13 (C'13, M'13, Y'13) |
| . | |
| On the M axis | |
| P21 (0, M21, 0) → | P'21 (C'21, M'21, Y'21) |
| P22 (0, M22, 0) → | P'22 (C'22, M'22, Y'22) |
| P23 (0, M23, 0) → | P'23 (C'23, M'23, Y'23) |
| . | |
| On the Y axis | |
| P31 (0, 0, Y31) → | P'31 (C'31, M'31, Y'31) |
| P32 (0, 0, Y32) → | P'32 (C'32, M'32, Y'32) |
| P33 (0, 0, Y33) → | P'33 (C'33, M'33, Y'33) |
| . | |
| On the C=M=Y axis | |
| P40 (0, 0, 0) → | P'40 (C'40, M'40, Y'40) |
| P41 (C41, M41, Y41) → | P'41 (C'41, M'41, Y'41) |
| P42 (C42, M42, Y42) → | P'42 (C'42, M'42, Y'42) |
| P43 (C43, M43, Y43) → | P'43 (C'43, M'43, Y'43) |
| . | |
| On the C =M axis (Y=0) | |
| P51 (C51, M51, 0) → | P'51 (C'51, M'51, Y'51) |
| P52 (C52, M52, 0) → | P'52 (C'52, M'52, Y'52) |
| P53 (C53, M52, 0) → | P'53 (C'53, M'53, Y'53) |
| . | |
| On the M=Y axis (C=0) | |
| P61 (0, M61, Y61) → | P'61 (C'61, M'61, Y'61) |
| P62 (0, M62, Y62) → | P'62 (C'62, M'62, Y'62) |
| P63 (0, M63, Y63) → | P'63 (C'63, M'63, Y'63) |
| . | |
| On the Y=C axis (M=0) | |
| P71 (C71, 0, Y71) → | P'71 (C'71, M'71, Y'71) |
| P72 (C72, 0, Y72) → | P'72 (C'72, M'72, Y'72) |
| P73 (C73, 0, Y73) → | P'73 (C'73, M'73, Y'73) |
| . | |

FIG.10

| Coordinates value | Color correction data |
|---|---|
| On the C axis | |
| P11 (C11, 0, 0) → | P'11 (C'11, M'11, Y'11) |
| P12 (C12, 0, 0) → | P'12 (C'12, M'12, Y'12) |
| P13 (C13, 0, 0) → | P'13 (C'13, M'13, Y'13) |
| ⋮ | |
| On the M axis | |
| P21 (0, M21, 0) → | P'21 (C'21, M'21, Y'21) |
| P22 (0, M22, 0) → | P'22 (C'22, M'22, Y'22) |
| P23 (0, M23, 0) → | P'23 (C'23, M'23, Y'23) |
| ⋮ | |
| On the Y axis | |
| P31 (0, 0, Y31) → | P'31 (C'31, M'31, Y'31) |
| P32 (0, 0, Y32) → | P'32 (C'32, M'32, Y'32) |
| P33 (0, 0, Y33) → | P'33 (C'33, M'33, Y'33) |
| ⋮ | |
| On the C=M=Y axis | |
| P40 ( 0, 0, 0) → | P'40 (C'40, M'40, Y'40) |
| P41 (C41, M41, Y41) → | P'41 (C'41, M'41, Y'41) |
| P42 (C42, M42, Y42) → | P'42 (C'42, M'42, Y'42) |
| P43 (C43, M43, Y43) → | P'43 (C'43, M'43, Y'43) |
| ⋮ | |
| On the M=Y=100 axis | |
| P81 (C81, 100, 100) → | P'81 (C'81, M'81, Y'81) |
| P82 (C82, 100, 100) → | P'82 (C'82, M'82, Y'82) |
| P83 (C83, 100, 100) → | P'83 (C'83, M'83, Y'83) |
| ⋮ | |
| On the C=Y=100 axis | |
| P91 (100, M91, 100) → | P'91 (C'91, M'91, Y'91) |
| P92 (100, M92, 100) → | P'92 (C'92, M'92, Y'92) |
| P93 (100, M93, 100) → | P'93 (C'93, M'93, Y'93) |
| ⋮ | |
| On the C=M=100 axis | |
| P101(100, 100, Y101) → | P'101(C'101, M'101, Y'101) |
| P102(100, 100, Y102) → | P'102(C'102, M'102, Y'102) |
| P103(100, 100, Y103) → | P'103(C'103, M'103, Y'103) |
| ⋮ | |

FIG.18

| Group | Coordinates value | | Color correction data |
|---|---|---|---|
| C axis group | P10 (100, 0, 0)<br>P11 (C11, M11, Y11)<br>P12 (C12, M12, Y12)<br>P13 (C13, M13, Y13) | →<br>→<br>→<br>→ | P'10 (C'10, M'10, Y'10)<br>P'11 (C'11, M'11, Y'11)<br>P'12 (C'12, M'12, Y'12)<br>P'13 (C'13, M'13, Y'13) |
| M axis group | P20 (0, 100, 0)<br>P21 (C21, M21, Y21)<br>P22 (C22, M22, Y22)<br>P23 (C23, M23, Y23) | →<br>→<br>→<br>→ | P'20 (C'20, M'20, Y'20)<br>P'21 (C'21, M'21, Y'21)<br>P'22 (C'22, M'22, Y'22)<br>P'23 (C'23, M'23, Y'23) |
| Y axis group | P30 (0, 0, 100)<br>P31 (C31, M31, Y31)<br>P32 (C32, M32, Y32)<br>P33 (C33, M33, Y33) | →<br>→<br>→<br>→ | P'30 (C'30, M'30, Y'30)<br>P'31 (C'31, M'31, Y'31)<br>P'32 (C'32, M'32, Y'32)<br>P'33 (C'33, M'33, Y'33) |
| C=M=Y axis group | P00 (0, 0, 0)<br>P40 (100, 100, 100)<br>P41 (C41, M41, Y41)<br>P42 (C42, M42, Y42)<br>P43 (C43, M43, Y43) | →<br>→<br>→<br>→<br>→ | P'00 (C'00, M'00, Y'00)<br>P'40 (C'40, M'40, Y'40)<br>P'41 (C'41, M'41, Y'41)<br>P'42 (C'42, M'42, Y'42)<br>P'43 (C'43, M'43, Y'43) |

FIG.21

| Group | Coordinates value | Color correction data |
|---|---|---|
| C axis group | P10 (100, 0, 0) →<br>P11 (C11, M11, Y11) →<br>P12 (C12, M12, Y12) →<br>P13 (C13, M13, Y13) →<br>⋮ | P'10 (C'10, M'10, Y'10)<br>P'11 (C'11, M'11, Y'11)<br>P'12 (C'12, M'12, Y'12)<br>P'13 (C'13, M'13, Y'13) |
| M axis group | P20 ( 0, 100, 0) →<br>P21 (C21, M21, Y21) →<br>P22 (C22, M22, Y22) →<br>P23 (C23, M23, Y23) →<br>⋮ | P'20 (C'20, M'20, Y'20)<br>P'21 (C'21, M'21, Y'21)<br>P'22 (C'22, M'22, Y'22)<br>P'23 (C'23, M'23, Y'23) |
| Y axis group | P30 ( 0, 0, 100) →<br>P31 (C31, M31, Y31) →<br>P32 (C32, M32, Y32) →<br>P33 (C33, M33, Y33) →<br>⋮ | P'30 (C'30, M'30, Y'30)<br>P'31 (C'31, M'31, Y'31)<br>P'32 (C'32, M'32, Y'32)<br>P'33 (C'33, M'33, Y'33) |
| C=M=Y axis group | P00 ( 0, 0, 0) →<br>P40 (100, 100, 100) →<br>P41 (C41, M41, Y41) →<br>P42 (C42, M42, Y42) →<br>P43 (C43, M43, Y43) →<br>⋮ | P'00 (C'00, M'00, Y'00)<br>P'40 (C'40, M'40, Y'40)<br>P'41 (C'41, M'41, Y'41)<br>P'42 (C'42, M'42, Y'42)<br>P'43 (C'43, M'43, Y'43) |
| C=M axis group (Y=0) | P50 (100, 100, 0) →<br>P51 (C51, M51, Y51) →<br>P52 (C52, M52, Y52) →<br>P53 (C53, M53, Y53) →<br>⋮ | P'50 (C'50, M'50, Y'50)<br>P'51 (C'51, M'51, Y'51)<br>P'52 (C'52, M'52, Y'52)<br>P'53 (C'53, M'53, Y'53) |
| M=Y axis group (C=0) | P60 ( 0, 100, 100) →<br>P61 (C61, M61, Y61) →<br>P62 (C62, M62, Y62) →<br>P63 (C63, M63, Y63) →<br>⋮ | P'60 (C'60, M'60, Y'60)<br>P'61 (C'61, M'61, Y'61)<br>P'62 (C'62, M'62, Y'62)<br>P'63 (C'63, M'63, Y'63) |
| Y=C axis group (M=0) | P70 (100, 0, 100) →<br>P71 (C71, M71, Y71) →<br>P72 (C72, M72, Y72) →<br>P73 (C73, M73, Y73) →<br>⋮ | P'70 (C'70, M'70, Y'70)<br>P'71 (C'71, M'71, Y'71)<br>P'72 (C'72, M'72, Y'72)<br>P'73 (C'73, M'73, Y'73) |

FIG. 23

| Group | Coordinates value | | Color correction data |
|---|---|---|---|
| C axis group | P10 (100, 0, 0)<br>P11 (C11, M11, Y11)<br>P12 (C12, M12, Y12)<br>P13 (C13, M13, Y13) | →<br>→<br>→<br>→ | P'10 (C'10, M'10, Y'10)<br>P'11 (C'11, M'11, Y'11)<br>P'12 (C'12, M'12, Y'12)<br>P'13 (C'13, M'13, Y'13) |
| M axis group | P20 (0, 100, 0)<br>P21 (C21, M21, Y21)<br>P22 (C22, M22, Y22)<br>P23 (C23, M23, Y23) | →<br>→<br>→<br>→ | P'20 (C'20, M'20, Y'20)<br>P'21 (C'21, M'21, Y'21)<br>P'22 (C'22, M'22, Y'22)<br>P'23 (C'23, M'23, Y'23) |
| Y axis group | P30 (0, 0, 100)<br>P31 (C31, M31, Y31)<br>P32 (C32, M32, Y32)<br>P33 (C33, M33, Y33) | →<br>→<br>→<br>→ | P'30 (C'30, M'30, Y'30)<br>P'31 (C'31, M'31, Y'31)<br>P'32 (C'32, M'32, Y'32)<br>P'33 (C'33, M'33, Y'33) |
| C=M=Y axis group | P00 (0, 0, 0)<br>P40 (100, 100, 100)<br>P41 (C41, M41, Y41)<br>P42 (C42, M42, Y42)<br>P43 (C43, M43, Y43) | →<br>→<br>→<br>→<br>→ | P'00 (C'00, M'00, Y'00)<br>P'40 (C'40, M'40, Y'40)<br>P'41 (C'41, M'41, Y'41)<br>P'42 (C'42, M'42, Y'42)<br>P'43 (C'43, M'43, Y'43) |
| C=M=100 axis group | P80 (100, 100, 0)<br>P81 (C81, M81, Y81)<br>P82 (C82, M82, Y82)<br>P83 (C83, M83, Y83) | →<br>→<br>→<br>→ | P'80 (C'80, M'80, Y'80)<br>P'81 (C'81, M'81, Y'81)<br>P'82 (C'82, M'82, Y'82)<br>P'83 (C'83, M'83, Y'83) |
| M=Y=100 axis group | P90 (0, 100, 100)<br>P91 (C91, M91, Y91)<br>P92 (C92, M92, Y92)<br>P93 (C93, M93, Y93) | →<br>→<br>→<br>→ | P'90 (C'90, M'90, Y'90)<br>P'91 (C'91, M'91, Y'91)<br>P'92 (C'92, M'92, Y'92)<br>P'93 (C'93, M'93, Y'93) |
| Y=C=100 axis group | P100 (100, 0, 100)<br>P101 (C101, M101, Y101)<br>P102 (C102, M102, Y102)<br>P103 (C103, M103, Y103) | →<br>→<br>→<br>→ | P'100 (C'100, M'100, Y'100)<br>P'101 (C'101, M'101, Y'101)<br>P'102 (C'102, M'102, Y'102)<br>P'103 (C'103, M'103, Y'103) |

FIG.26

| Group | Coordinates value | Color correction data |
|---|---|---|
| CM plane group | P111(C111, M111, Y111)→P'111(C'111, M'111, Y'111)<br>P112(C112, M112, Y112)→P'112(C'112, M'112, Y'112)<br>P113(C113, M113, Y113)→P'113(C'113, M'113, Y'113)<br>. | |
| MY plane group | P121(C121, M121, Y121)→P'121(C'121, M'121, Y'121)<br>P122(C122, M122, Y122)→P'122(C'122, M'122, Y'122)<br>P123(C123, M123, Y123)→P'123(C'123, M'123, Y'123)<br>. | |
| CY plane group | P131(C131, M131, Y131)→P'131(C'131, M'131, Y'131)<br>P132(C132, M132, Y132)→P'132(C'132, M'132, Y'132)<br>P133(C133, M133, Y133)→P'133(C'133, M'133, Y'133)<br>. | |
| Apex | PP0 (  0,   0,   0) → PP'0 (C'200, M'200, Y'200)<br>PP1 (100,   0,   0) → PP'1 (C'201, M'201, Y'201)<br>PP2 (100, 100,   0) → PP'2 (C'202, M'202, Y'202)<br>PP3 (  0, 100,   0) → PP'3 (C'203, M'203, Y'203)<br>PP4 (  0,   0, 100) → PP'4 (C'204, M'204, Y'204)<br>PP5 (100,   0, 100) → PP'5 (C'205, M'205, Y'205)<br>PP6 (100, 100, 100) → PP'6 (C'206, M'206, Y'206)<br>PP7 (  0, 100, 100) → PP'7 (C'207, M'207, Y'207) | |

COLOR CONVERSION DEVICE

BACKGROUND OF THE INVENTION

(1) Field of the Invention

The present invention relates to a color image processing apparatus, in particular, relates to a color conversion device in a color image processing apparatus for obtaining the identical color reproducibility, in color scanners, color cameras, color hard copy devices, color image input devices, display devices, output devices and the like in which high-speed color adjustment and color correction are necessary.

(2) Description of the Prior Art

As the color conversion method in the field of color printing and color hard copy, there has been conventionally proposed a three-dimensional interpolation using a look-up table, which is disclosed in, for example, Japanese Patent Application Laid-open Sho 63 No. 162248.

As shown in FIG. 1A, this is a method for performing the color conversion, comprising steps of dividing the three-dimensional color space into a plurality of unit cube, setting a color correction value obtained by a calculation in advance to each lattice point of the cubic pattern, selecting a unit cube containing an input color, and using an output value at a plurality of apexes of the unit cube. In this example, it is characterized in that, as shown in FIG. 1B, the values of eight apexes of the unit cube are used for the interpolation processing, in which a correction value is obtained by designating an apex opposite to a point of a correction value to be determined and a volume in a space area of a rectangular parallelepiped formed at the input point as a weight coefficients at a point of the correction value to be determined.

With the conventional color conversion method as described above, however, as the input color space is divided more fine, that is, as the distance between the lattice points becomes smaller, the accuracy of interpolation becomes high, but the lattice points increase. Hence, the memory capacity for storing the color correction value set at the lattice points increases, resulting in increase of processing time for the calculation and complexity in the hardware structure. Moreover, it is time-consuming to obtain the correction value itself to be stored.

Furthermore, it is characterized in that the accuracy necessary for each axis in the normal three-dimensional color space is nonuniform, hence when the interpolation method is applied for the color conversion, it is preferable that the bit number of each axis in the table memory used for the interpolation be not uniform. If the total bit number is constant, high-quality interpolation of the color information becomes possible which suits the human's visual property without increasing the memory capacity, by taking nonuniform bit structure. However, with the conventional technique, since the basic unit of interpolation is a unit cube within the three-dimensional color space made by the input signal, there is a problem in that the interpolation taking the human's visual property into account cannot be performed.

SUMMARY OF THE INVENTION

In view of the foregoing, it is an object of the present invention to provide a color conversion device which realizes a desired color conversion processing with a simple hardware structure, in which the color correction is performed not by finely dividing the three-dimensional color space, but by arranging discretely optimum color correction signal data only in the vicinity of a certain axis, selecting representative points discretely arranged in the vicinity of an axis of the input color at the time of color conversion and performing the color conversion by means of a linear interpolation with weighting, so that look-up table data can be extremely reduced.

The present invention is so constituted as gists described below in order to attain the above object.

The first gist of the present invention is a color conversion device for performing a conversion from arbitrary coordinates on a first three-dimensional color space to predetermined coordinates on a second three-dimensional color space, comprising: a region judging section which, in the first three-dimensional color space, sets N+3 axes in total with 3 axes orthogonal to each other designating the origin as a center and N lines separately from the three orthogonal axes, arranges predetermined number of representative points discretely on the N+3 axes, and discriminates in which region the input color signal values belongs when each coordinates on the first three-dimensional color space is divided into a plurality of regions according to a distance to the N+3 axes; a representative points selecting section for obtaining three representative points by selecting one representative point near the input color signal value, respectively, on the three axes present on the boundary of the discriminated region; a look-up table indicating to which coordinates in the second three-dimensional color space the representative points in the first three-dimensional color space are converted at the time of conversion from the first three-dimensional color space to the second three-dimensional color space; and an interpolation section for performing color conversion of the input color signal value on the first three-dimensional color space by a linear or a predetermined method using the three representative points corresponding to the input color signal value and the look-up table.

The second gist of the present invention is a color conversion device according to the first gist, wherein when the coordinates on the line determined by the three orthogonal axes are designated as (Xa, Xb, Xc), the linear axis is set in one and satisfies the condition of Xa=Xb=Xc.

The third gist of the present invention is a color conversion device according to the second gist, wherein when the coordinates on the line determined by the three orthogonal axes are designated as (Xa, Xb, Xc), the linear axis is set in three and they satisfy the condition of Xa=Xb and Xc=0, Xb=Xc and Xa=0, and Xc=Xa and Xb=0, respectively.

The fourth gist of the present invention is a color conversion device according to the third gist, which includes or adds, as an axis, three lines passing through coordinates in which three components in the first three-dimensional color space become the largest, respectively, as a line set separately from the three orthogonal axes.

The fifth gist of the present invention is a color conversion device according to the fourth gist, wherein the configuration density of the discrete representative points on the axis satisfying the coordinates Xa=Xb=Xc is made higher than that of other axes.

The sixth gist of the present invention is a color conversion device according to the fifth gist, wherein the configuration density of the discrete representative points is increased in a medium density area.

The seventh gist of the present invention is a color conversion device according to the sixth gist, which includes a plurality of look-up tables and a look-up table selecting section, wherein the look-up table is changed over by a user.

The eighth gist of the present invention is a color conversion device according to the sixth gist, which includes a plurality of look-up tables and a histogram forming section for reading the color density value of the input image, wherein the look-up table is automatically changed over according to the statistic volume of the input image.

The ninth gist of the present invention is a color conversion device, wherein, with regard to the representative points in the eighth gist, three new representative points are set at a foot of normal drawn from the input color signal value, respectively, with respect to three axes corresponding to the input color signal value, and it is determined, with respect to the respective new representative points, using two representative points arranged on both sides on the same axis as the new representative points and the look-up table thereof, that to which coordinates in the second three-dimensional color space the new representative points in the first three-dimensional color space are converted.

The tenth gist of the present invention is a color conversion device according to the eighth gist, wherein the look-up table is replaced with a numerical expression set for every axis.

The eleventh gist of the present invention is a color conversion device for performing conversion from arbitrary coordinates on a first three-dimensional color space to predetermined coordinates on a second three-dimensional color space, comprising:

a representative points-dispersed axis selecting section which, in the first three-dimensional color space, sets (N+3) axes with three axes orthogonal to each other designating the origin as a center and N lines separate from the three orthogonal axes, arranges predetermined number of representative points discretely at each apex of the three-dimensional cube and in the vicinity of the (N+3) axes so that there is no other representative point on a line connecting a certain representative point and the origin, divides sets of representative points into groups per unit of each set axis and selects a group of representative points-dispersed axes which is in the vicinity of the input signal value;

a representative points selecting section for obtaining three representative points by selecting the representative points nearest to the input color signal value from each selected representative points-dispersed axis;

a look-up table indicating to which coordinates in the second three-dimensional color space the representative points in the first three-dimensional color space are converted at the time of conversion from the first three-dimensional color space to the second three-dimensional color space; and an interpolation section for performing color conversion of the input color signal value on the first three-dimensional color space by a linear or a predetermined method using the three representative points corresponding to the input color signal value and the look-up table.

The twelfth gist of the present invention is a color conversion device according to the eleventh gist, wherein when the coordinates on the line determined by the three orthogonal axes are designated as (Xa, Xb, Xc), the linear axis is set in one and satisfies the condition of Xa=Xb=Xc.

The thirteenth gist of the present invention is a color conversion device according to the eleventh gist, wherein when the coordinates on the line determined by the three orthogonal axes is designated as (Xa, Xb, Xc), the linear axis is set in three and they satisfy the condition of Xa=Xb and Xc=0, Xb=Xc and Xa=0, and Xc=Xa and Xb=0, respectively.

The fourteenth gist of the present invention is a color conversion device according to the eleventh gist, wherein when the coordinate on the line determined by the three orthogonal axes is designated as (Xa, Xb, Xc), the linear axis is set in three, and they pass through the apex of the three-dimensional cube in which three components of the coordinates take the largest value and satisfy the condition of Xa=Xb, Xb=Xc and Xc=Xa, respectively.

The fifteenth gist of the present invention is a color conversion device according to the twelfth gist, wherein three linear axes are further set, and the linear axes satisfy the condition of Xa=Xb and Xc=0, Xb=Xc and Xa=0, and Xc=Xa and Xb=0, respectively.

The sixteenth gist of the present invention is a color conversion device according to the thirteenth gist, wherein three linear axes are further set, and they pass through the apex of the three-dimensional cube in which three components of the coordinates take the largest value and satisfy the condition of Xa=Xb, Xb=Xc and Xc=Xa, respectively.

The seventeenth gist of the present invention is a color conversion device according to the sixteenth gist, wherein when the coordinates on the line determined by the three orthogonal axes are design ated as (Xa, Xb, Xc),the configuration density of the discrete representative points on the linear axis which is set in one and satisfies the condition of Xa=Xb=Xc and in the vicinity of the axis is made higher than that of other axes.

The eighteenth gist of the present invention is a color conversion device according to the seventeenth gist, wherein the configuration density of the discrete representative points is increased in a medium brightness area.

The nineteenth gist of the present invention is a color conversion device for performing conversion from arbitrary coordinates on a first three-dimensional color space to predetermined coordinates on a second three-dimensional color space, comprising:

a nearby plane selecting section which, in the first three-dimensional color space, sets three axes orthogonal to each other, designating the origin as a center, arranges predetermined number of representative points discretely on the axes and on six planes forming the three-dimensional cube, and selects a plane in the vicinity of the input color signal value;

a representative points selecting section for obtaining three representative points by selecting the representative points nearest to the input color signal value from the respective six planes;

a look-up table indicating to which coordinates in the second three-dimensional color space the representative points in the first three-dimensional color space are converted at the time of conversion from the first three-dimensional color space to the second three-dimensional color space; and an interpolation section for performing color conversion of the input color signal value on the first three-dimensional color space by a linear or a predetermined method using the three representative points corresponding to the input color signal value and the look-up table.

BRIEF DESCRIPTION OF THE DRAWINGS

FIG. 4 is a diagram corresponding to the LUT data according to the first embodiment.

FIGS. 5A and 5B are diagrams explaining the outline of the linear interpolation by means of nearby three points.

FIG. 6 is a diagram explaining the outline of the linear interpolation on an axis.

FIG. 8 is a diagram corresponding to the LUT data according to the second embodiment.

FIG. 10 is a diagram corresponding to the LUT data according to the third embodiment.

FIG. 18 is a diagram corresponding to the LUT data according to the tenth embodiment.

FIG. 21 is a diagram corresponding to the LUT data according to the eleventh embodiment.

FIG. 23 is a diagram corresponding to the LUT data according to the twelfth embodiment.

FIG. 26 is a diagram corresponding to the LUT data according to the thirteenth embodiment.

DESCRIPTION OF THE PREFERRED EMBODIMENTS

Preferred embodiments of the color conversion device according to the present invention will now be described with reference to the accompanying drawings.

Figure 1A:
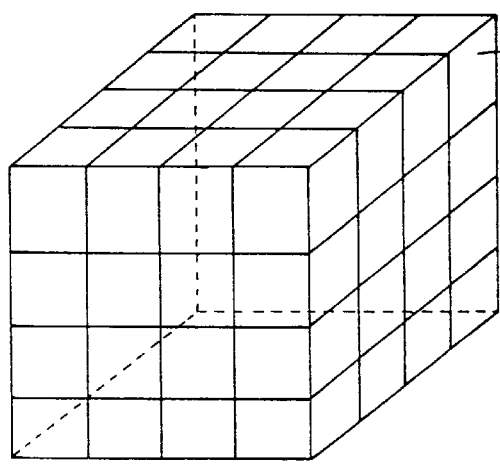
FIGS. 1A and 1B are schematic diagrams of a conventional arrangement example of representative points.
Figure 1B:
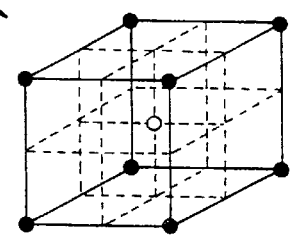
Figure 2:
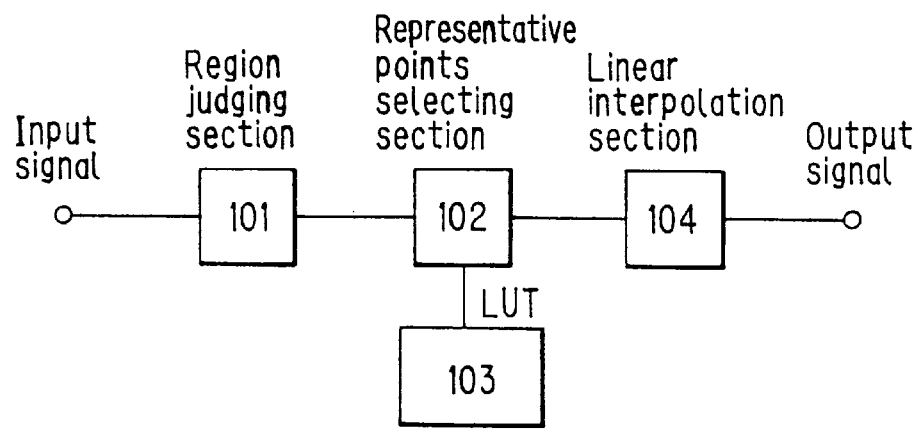
FIG. 2 is a block diagram showing a schematic structure of a color conversion section according to the first embodiment.

FIG. 2 is a block diagram showing a schematic structure of a color conversion processing section according to a first embodiment of the present invention, which comprises a region judging section 101 for judging in which area the input value resides in the three-dimensional color space, a representative points selecting section 102 for selecting representative points arranged discretely on an axis, respectively, a look-up table (LUT) 103 for storing the coordinates of representative points and color correction data, and a linear interpolation section 104 for performing color conversion by means of weighting based on the selected representative points.

Figure 3:
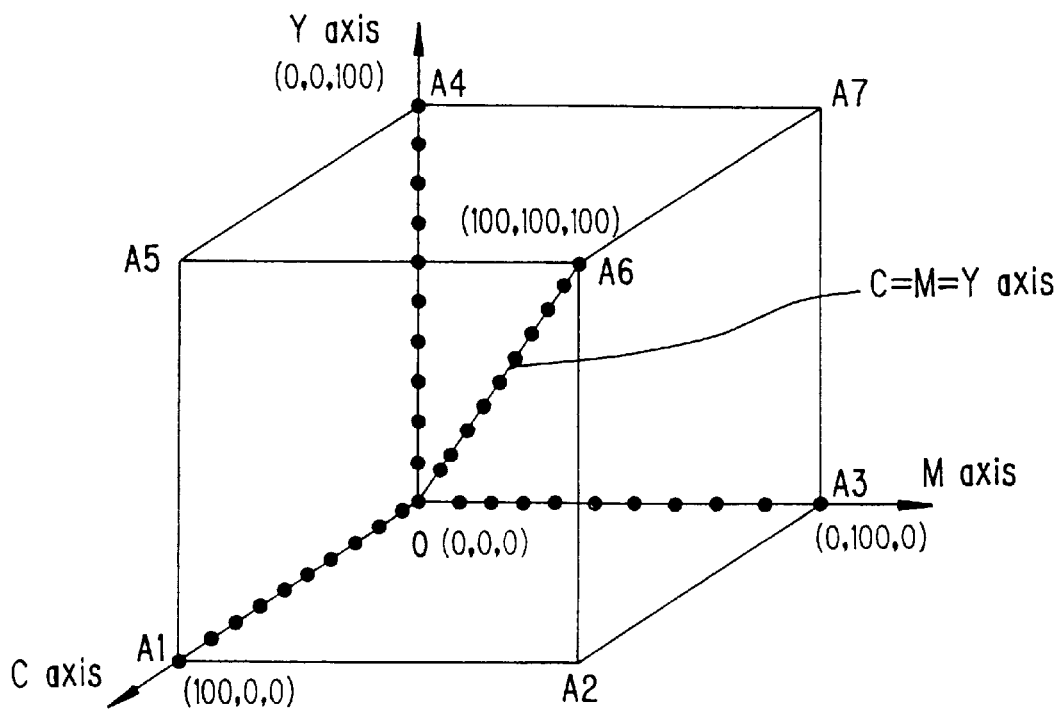
FIG. 3 is a schematic diagram showing the configuration of representative points in the LUT according to the first embodiment.

FIG. 3 schematically shows a configuration of the representative points. In FIG. 3, the representative points are arranged discretely on four axes of C axis, M axis, Y axis and C=M=Y axis. Here, it is assumed that LUT 103 has color correction data as shown in FIG. 4 with respect to respective representative points, but the number of representative points and the configuration spacing are not limited thereto. The color correction data in FIG. 4 is determined according to the properties of devices to which the color conversion of the present invention is applied.

The three-dimensional color space is divided into three regions depending upon which axis is included therein, when three axes are taken into account in order of propinquity to the input value and the distance among the four axes shown in FIG. 3. Each region is a triangular pyramid designating the origin 0 as an apex, and two axes among C axis, M axis and Y axis and C=M=Y axis as the three generatrices which is cut by a cube representing the color space, resulting in square pyramids 0A1A2A3A6, 0A4A5A1A6, and 0A3A7A4A6.

A region judging section 101 judges that in which region among the above-mentioned regions the input value belongs according to the size relation of the three components of the input value. Each region includes three axes among the four axes shown in FIG. 3, and a representative point nearest to the input value is selected from each axis by a representative points selecting section 102. If it is assumed that, as shown in FIG. 5A, points P1 (C1, M1, Y1), P2 (C2, M2, Y2), and P3 (C3, M3, Y3) are selected as the nearby three points by the representative points selecting section 102, designating the input value as P (C, M, Y), the output value P' (C', M', Y') is given by the following expression:

$$\begin{pmatrix} C' \\ M' \\ Y' \end{pmatrix} = \begin{pmatrix} C'_1 & C'_2 & C'_3 \\ M'_1 & M'_2 & M'_3 \\ Y'_1 & Y'_2 & Y'_3 \end{pmatrix} \begin{pmatrix} C_1 & C_2 & C_3 \\ M_1 & M_2 & M_3 \\ Y_1 & Y_2 & Y_3 \end{pmatrix}^{-1} \begin{pmatrix} C \\ M \\ Y \end{pmatrix} \quad (1)$$

wherein, P'1 (C'1, M'1, Y'1), P'2 (C'2, M'2, Y'2), and P'3 (C'3, M'3, Y'3) represent color correction data of points P1, P2 and P3, respectively, as shown in FIG. 5B.

In addition, when the input value P is on either axis among C axis, M axis, Y axis and C=M=Y axis, two points nearest to the input value are selected from the axis by the representative points selecting section 102, and the output value P' is determined by means of the linear interpolation using these two points.

For example, if the input value P and points P1 and P2 are on the same axis, as shown in FIG. 6, points P1 and P2 are selected as two points nearest to the input value P, and the input value P divides the segment P1P2 into L2 and L1, the output value P' (C', M', Y') is given by the following expression:

$$\begin{pmatrix} C' \\ M' \\ Y' \end{pmatrix} = \frac{1}{L_1 + L_2} \left[ L_1 \begin{pmatrix} C'_1 \\ M'_1 \\ Y'_1 \end{pmatrix} + L_2 \begin{pmatrix} C'_2 \\ M'_2 \\ Y'_2 \end{pmatrix} \right] \quad (2)$$

Moreover, when the input value exists on the CM plane, MY plane or YC plane, the representative points are respectively selected from two axes which are in the vicinity thereof, and the linear interpolation is performed by weighting.

Figure 7:
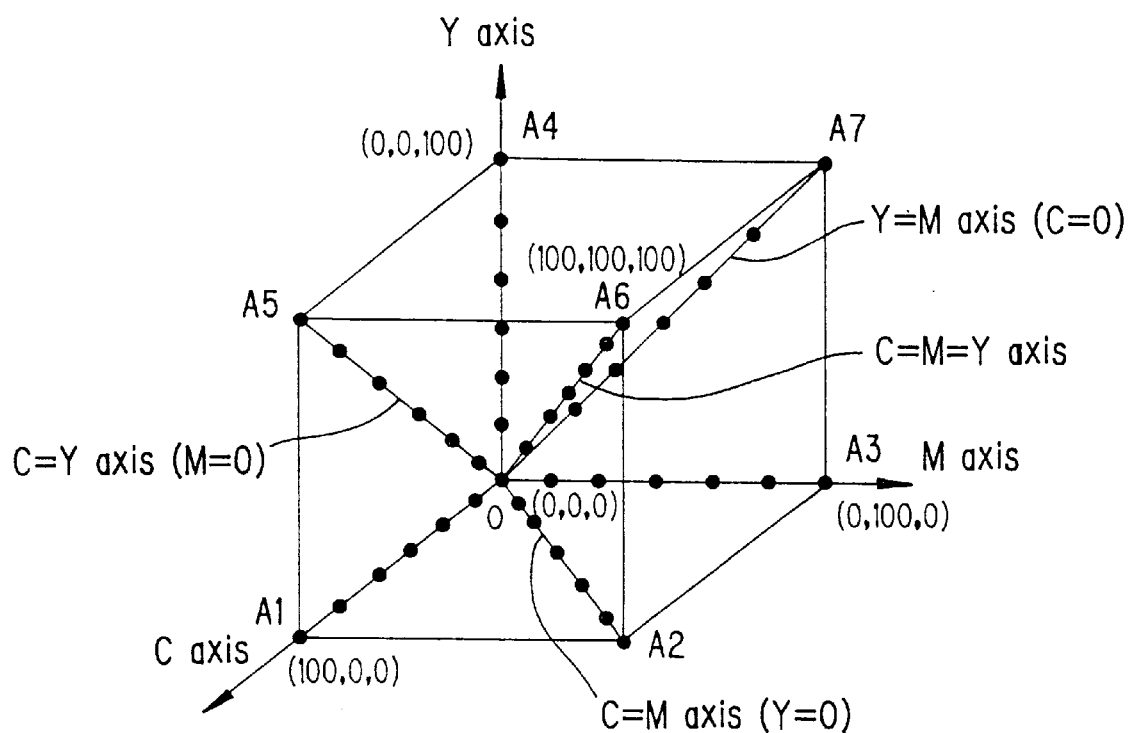
FIG. 7 is a schematic diagram showing the configuration of representative points in the LUT according to the second embodiment.

The second embodiment of the present invention will now be described. The schematic structure of this embodiment is shown in FIG. 2, as in the first embodiment, except that the number of axes for arranging representative points increases. The configuration of representative points in this embodiment is shown in FIG. 7. In FIG. 7, there are added three axes for arranging representative points, compared to FIG. 3. That is to say, representative points are discretely arranged on seven axes, C axis, M axis, Y axis, C=M=Y axis, C=M axis (Y=0), M=Y axis (C=0), and Y=C axis (M=0). Here, it is assumed that the LUT 103 has the color correction data as shown in FIG. 8, with respect to the respective coordinates of the representative points.

The number of representative points and the configuration spacing are not limited thereto. The color correction data in FIG. 8 is determined according to the properties of devices to which the color conversion of the present invention is applied. The three-dimensional color space is divided into six regions depending upon which axis is included therein, when three axes are taken into account in order of propinquity to the input value and the distance among the seven axes shown in FIG. 7. Each region is a triangular pyramid designating the origin 0 as an apex, and two axes in the neighborhood among C axis, M axis, Y axis, C=M axis (Y=0). M=Y axis (C=0) and Y=C axis (M=0), and C=M=Y axis as the three generatrices. This results in triangular pyramids OA1A2A6, OA1A5A6, OA2A3A6, OA3A6A7, 0A4A5A6, and 0A4A6A7.

The region judging section 101 in FIG. 2 judges that in which region among the above-mentioned six regions the input value belongs, and performs the color conversion processing in the same procedure as in the first embodiment. Moreover, when the input value exists on C=M plane, M=Y plane or Y=C plane, the representative points are respectively selected from two axes which are in the vicinity thereof, and the linear interpolation is performed by weighting. According to this embodiment, since the number of axes for arranging representative points of the LUT is increased, the color conversion becomes possible with higher accuracy.

Figure 9:
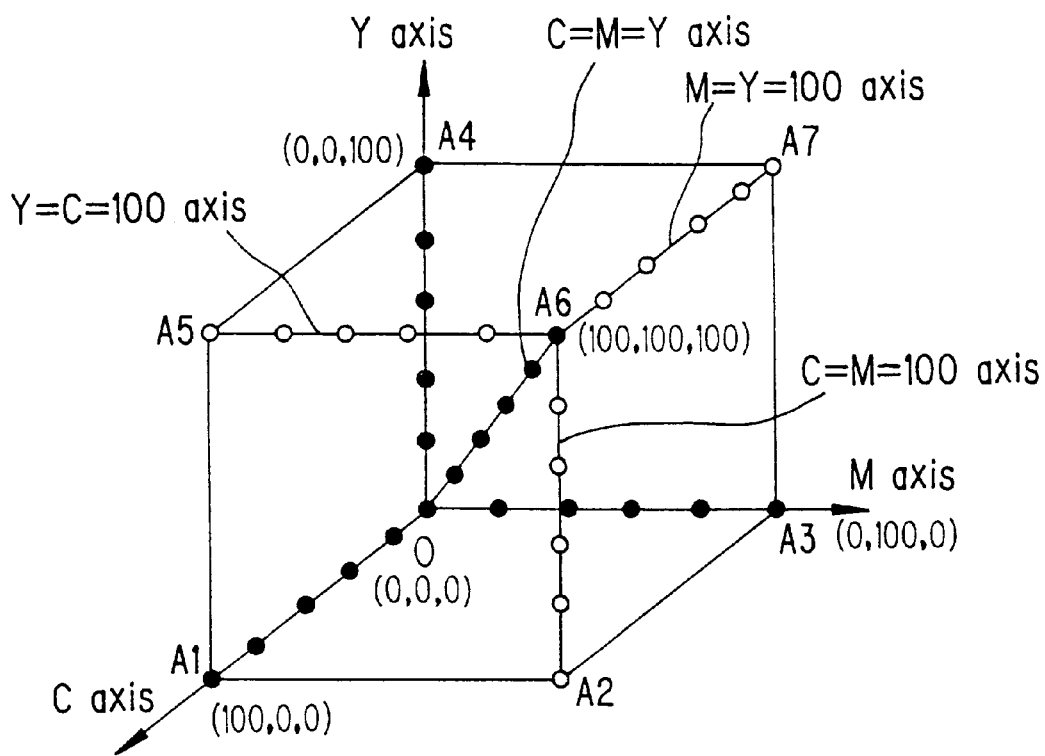
FIG. 9 is a schematic diagram showing the configuration of representative points in the LUT according to the third embodiment.

The third embodiment of the present invention will now be described. The schematic structure of this embodiment is shown in FIG. 2, as in the second embodiment, except that the number of axes for arranging representative points increases. The configuration of representative points in this embodiment is shown in FIG. 9. In FIG. 9, there are added three axes for arranging representative points, compared to FIG. 3. That is to say, representative points are discretely arranged on seven axes, in which three axes (axis being C=M=100, axis being M=Y=100, and axis being Y=C=100) are newly added which designate a point A6 (100, 100, 100) as a center and are orthogonal to each other. Here, it is assumed that the LUT 103 has the color correction data as shown in FIG. 10, with respect to the respective coordinates of the representative points. The number of representative points and the configuration spacing are not limited thereto.

The color correction data in FIG. 10 is to be determined according to the properties of devices to which the color conversion of the present invention is applied. The three-dimensional color space is divided into nine regions depending upon which axis is included therein, when three axes are taken into account in order of propinquity to the input value and the distance among the seven axes shown in FIG. 9.

The region judging section 101 in FIG. 2 judges that in which region among the above-mentioned nine regions the input value belongs, and performs the color conversion processing in the same procedure as in the second embodiment. According to this embodiment, since three axes for arranging representative points in the LUT are added, the accuracy of the color conversion is improved in the portion having high density.

The fourth embodiment of the present invention will now be described. Though the color conversion accuracy of the image differs largely depending upon the configuration of representative points, since, in the first embodiment, the C=M=Y axis is always selected, by making the density of the data arrangement on the C=M=Y axis high, it becomes possible to perform the color conversion with high accuracy.

The fifth embodiment of the present invention will now be described. Since the human eyes are not sensitive to the color difference in an area having a very high density, or in an area having a very low density, the conversion accuracy in these density area may be relatively low. Moreover, in the case of a natural image, the color data distribution in the three-dimensional color space tends to converge on a relatively medium density area. Therefore, by arranging more representative points in the medium density area in the three-dimensional color space, favorable color conversion becomes possible without increasing the memory volume.

Figure 11:
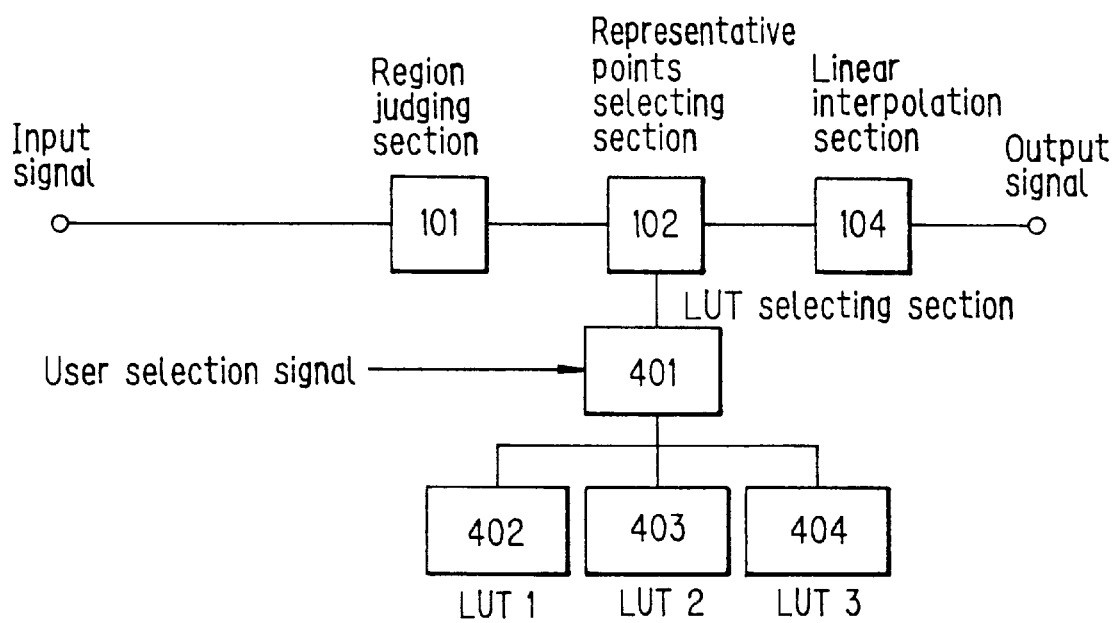
FIG. 11 is a block diagram showing a schematic structure of a color conversion section according to the sixth embodiment.

The sixth embodiment of the present invention will now be described. FIG. 11 shows a block diagram of this embodiment, which includes a LUT selecting section 401, as well as LUT1 (402), LUT2 (403) and LUT3 (404) which have different properties. The number of LUTs are not limited to 3. Users can adjust the hue of the output image according to their preference, by selecting a LUT using the LUT selecting section 401.

Figure 12:
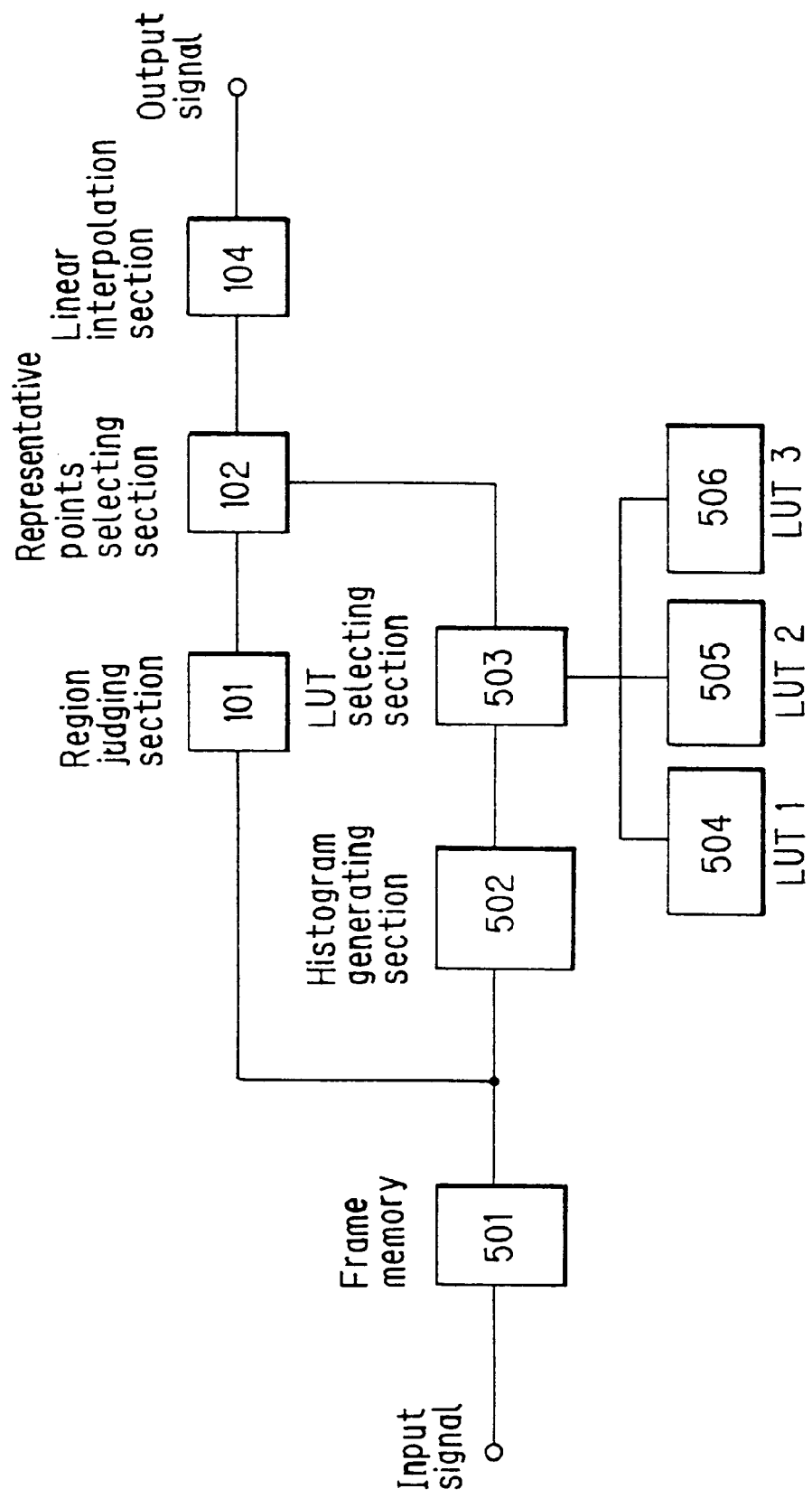
FIG. 12 is a block diagram showing a schematic structure of a color conversion section according to the seventh embodiment.

The seventh embodiment of the present invention will now be described. FIG. 12 shows a block diagram of this embodiment, in which a frame memory 501 and a histogram generating section 502 are newly provided, and further includes LUT1 (504), LUT2 (505) and LUT3 (506) which have different properties. The number of LUTs are not limited to 3. For example, LUT1 has a high configuration density of representative points in the low density area, LUT2 has a high configuration density of representative points in the medium density area, and LUT3 has a high configuration density of representative points in the high density area.

First, an input image is read into a frame memory 501 and a histogram of the image data is generated by a histogram generating section 502. Based on thus obtained histogram, when there is much distribution in the low density area, LUT1 is selected, when there is much distribution in the medium density area, LUT2 is selected, and when there is much distribution in the high density area, LUT3 is selected. As described above, by automatically selecting the LUT suitable for the input image, more preferable color conversion becomes possible.

Figure 13:
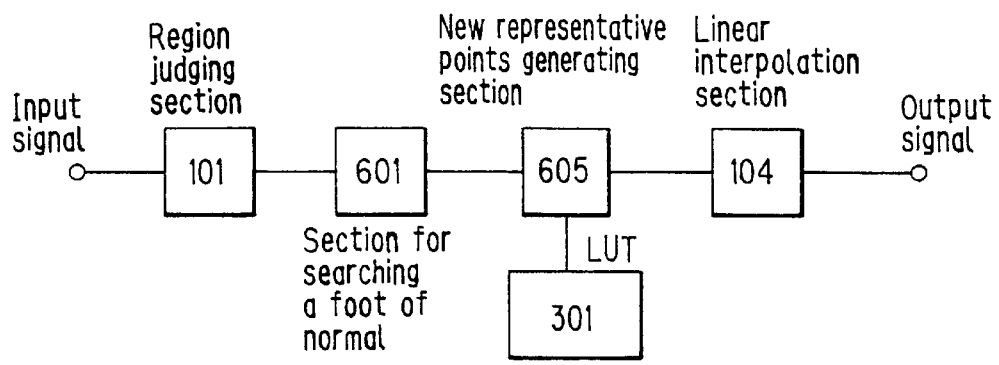
FIG. 13 is a block diagram showing a schematic structure of a color conversion section according to the eighth embodiment.

The eighth embodiment of the present invention will now be described. FIG. 13 shows a block diagram of this embodiment. First, when a region where the input point exists is decided by a region judging section 101, three axes near the input point are obtained. Next, a normal is drawn from the input point to the nearby axis, respectively, as shown in FIG.

14, by a section for searching a foot of normal 601. Points H1, H2 and H3 are feet of normal when a normal is drawn from the input point P to the nearby three axes.

Then, the color correction data at these points H1, H2 and H3 is obtained by dividing the axis at two representative points, respectively, located in the same axes with these points and on both sides of these points, by a new representative points generating section 605. When the color correction data is obtained at the foot of normal, as described above, the color conversion processing is performed with the same procedure as in the first embodiment by means of the linear interpolation using the data. The present invention can generate data nearer to the input point and use the data for the linear interpolation, hence the color conversion with high accuracy becomes possible.

Figure 14:
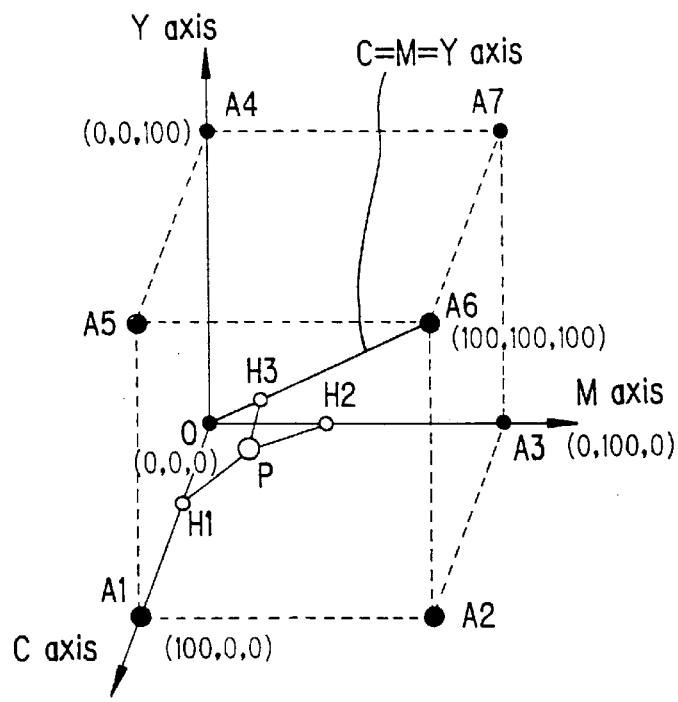
FIG. 14 is a diagram explaining feet of normal obtained with respect to the nearby axes from the input point in the three-dimensional color space in the eighth embodiment.
Figure 15:
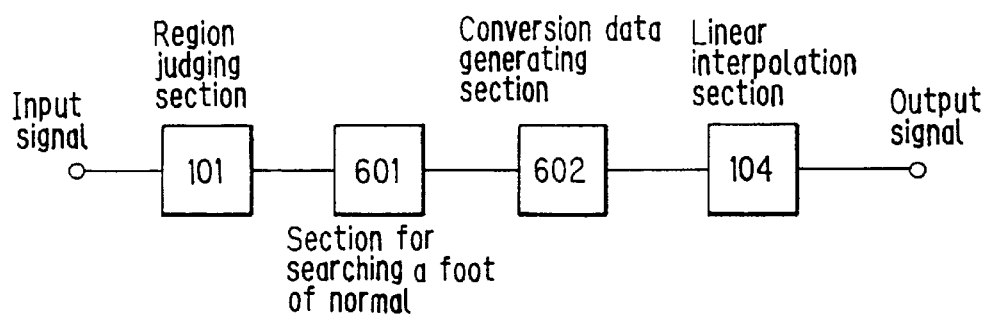
FIG. 15 is a block diagram showing a schematic structure of a color conversion section according to the ninth embodiment.

The ninth embodiment of the present invention will now be described. FIG. 15 shows a block diagram of this embodiment. In this embodiment, representative points are not discretely arranged on the axis, but a numerical expression is provided for the color correction for every axis. Therefore, no LUT is necessary. When a region where the input point exists is obtained by the region judging section 101, three axes near the input point are obtained. Then, a normal is drawn from the input point to the nearby axis, respectively, as shown in FIG. 14, by a section for searching a foot of normal 601, thus three feet of normal are obtained.

Here, since a numerical expression for the color conversion is set for each axis, the color conversion data at the coordinates value at the foot of normal obtained beforehand is obtained by a conversion data generating section 602. Thus, the color conversion data at three points in the vicinity thereof are obtained, respectively, and by using the data, the color conversion processing is performed with the same procedure as in the first embodiment by means of the linear interpolation. With this embodiment, since no LUT is necessary, it is possible to greately reduce the memory capacity.

With the above-mentioned embodiments, it is confirmed by the subjective evaluation that in the color printer, it is possible to perform the color conversion of the same level as the conventional color conversion with a less volume of operation, which is the characteristic of these embodiments. With these embodiments, the color conversion is not limited to color printers, but can be applied to various input devices and image output devices, for example, in the case of performing the color conversion in scanners and CRT monitors.

Figure 16:
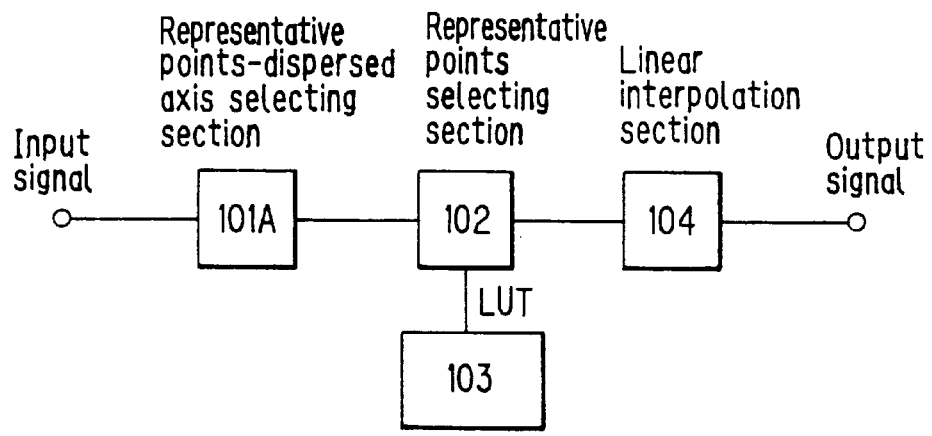
FIG. 16 is a block diagram showing a schematic structure of a color conversion section according to the tenth embodiment.

FIG. 16 shows a block diagram showing a schematic structure of a color conversion section according to the 10th embodiment, which comprises a representative points-dispersed axis selecting section 101A which judges in which region in the three-dimensional color space the input value exists and selects a representative points-dispersed axis which becomes the nearby axis in this case; a representative points selecting section 102 for selecting representative points which are in the vicinity of the input value among representative points discretely arranged along respective axes within the selected representative points-dispersed axis; a look-up table (LUT) 103 which stores the coordinates of the representative points and the color correction data, and a linear interpolation section 104 which performs the color conversion by weighting based on the selected representative points.

Here, the details are explained using the CMY space as the three-dimensional color space, but the same applies to the RGB space.

Figure 17:
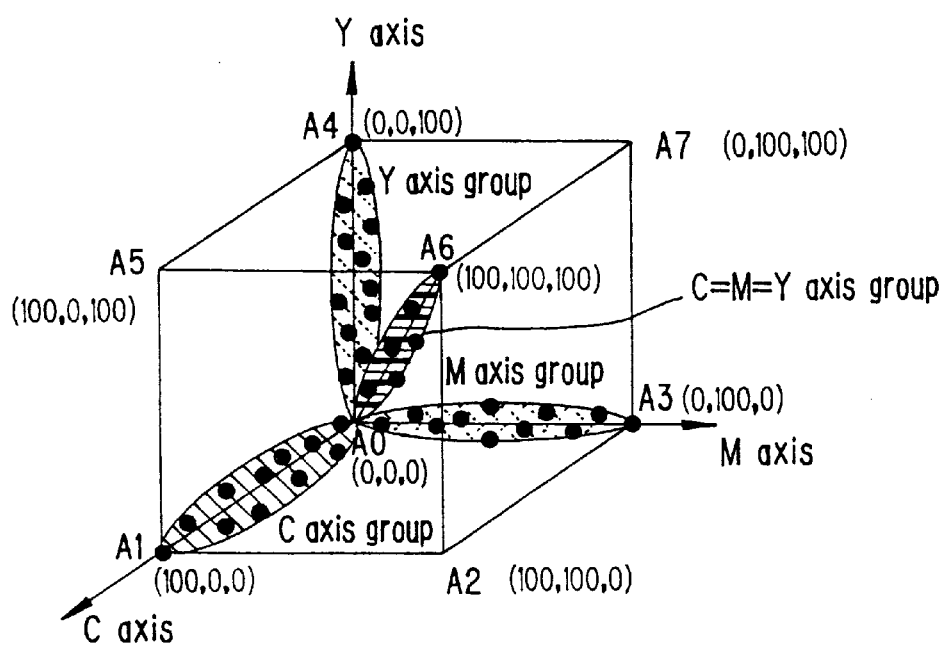
FIG. 17 is a schematic diagram showing the configuration of representative points in the LUT according to the tenth embodiment.

FIG. 17 schematically shows the representative points-dispersed axis and the configuration of representative points.

As shown in FIG. 17, the three-dimensional color space is a rectangular coordinates system obtained by three axes which designate the origin as a center and are orthogonal to each other, that is, C axis, M axis and Y axis. In this space is formed a cube composed of apexes having the following coordinates: A0 (0, 0, 0), A1 (100, 0, 0), A2 (100, 100, 0), A3 (0, 100, 0), A4, (0, 0, 100), A5 (100, 0, 100), A6 (100, 100, 100), and A7 (0, 100, 100). Here, the C axis passes through each apex A0–A1, the M axis passes through each apex A0–A3, the Y axis passes through each apex A0–A4, and the above coordinates are the coordinates component of the C axis, M axis and Y axis in this order. Additionally, a line passing through A0–A6 is set as an axis. In this linear axis, coordinates on the line (Xa, Xb, Xc) satisfies the condition of Xa=Xb=Xc. Therefore, this linear axis is referred to as a C=M=Y axis.

In FIG. 17, representative points are grouped for every axis of C axis, M axis, Y axis, C=M=Y axis, and discretely arranged at the endpoint of these four axes (including the origin) and in the vicinity of the axis. However, the configuration of representative points is an irregular configuration such that in the three-dimensional color space, on a line connecting a certain representative point and the origin, no other representative point exists.

Here, it is assumed that the LUT 103 has the color correction data as shown in FIG. 18 with respect to respective representative points, but the number and the configuration spacing of representative points are not limited thereto. The color correction data of FIG. 18 is to be determined according to the properties of devices to which the color conversion of the present invention is applied.

The three-dimensional color space is divided into three regions depending upon which axis is included therein, when the axis groups are taken into account in order of propinquity to the input value and the distance among the four axis groups shown in FIG. 17. Each region is a triangular pyramid designating the origin 0 as an apex, and two axes among C axis group, M axis group and Y axis group and C=M=Y axis group as the three generatrices which is cut by a cube representing the color space, resulting in square pyramids OA1A2A3A6, 0A4A5A1A6, and 0A3A7A4A6.

A representative points-dispersed axis selecting section 101A judges that in which region among the above-mentioned three regions the input value belongs according to the size relation of the three components of the input value, and selects three axis groups which are in the vicinity thereof. Each region is ruled by a triangular pyramid which designates the three axes as the generatrix among the four axes shown in FIG. 17, and the three axis groups to be targeted are determined depending upon the triangular pyramid which contains the input value. For example, when the input color signal has a percentage of (C, M, Y)=(60%, 40%, 30%), the input value is contained in the square pyramid OA1A2A3A6 in FIG. 17, and the nearest axis groups to be targeted become the C axis group, M axis group, and C=M=Y axis group.

Then, among these three nearest axis groups in which representative points are irregularly arranged, a representative point nearest to the input signal value is selected one each for every axis group, in total three representative points are selected by the representative points selecting section 102. The representative points are discretely arranged for each axis group, and the distance between the input point and the representative point is determined for every axis group by means of the least squares, and the representative point having the shortest distance is designated as the nearest point in that axis group.

As shown in FIG. 5A, if it is assumed that the input value is designated as P (C, M, Y), and points P1 (C1, M1, Y1), P2 (C2, M2, Y2) and P3 (C3, M3, Y3) are selected as the points in the vicinity of the input value, and when they are expressed by a vector, $$\vec{OP} = \alpha \vec{OP}_1 + \beta \vec{OP}_2 + \gamma \vec{OP}_3 \quad (\alpha, \beta \text{ and } \gamma \text{ are arbitrary}) \quad (3)$$

wherein, if it is assumed that P'1 (C'1, M'1, Y'1), P'2 (C'2, M'2, Y'2) and P'3 (C'3, M'3, Y'3) are, as shown in FIG. 5B (described above), the color correction data of respective points P1, P2 and P3, the output value P' (C', M', Y') are given by the following expression:

$$\vec{OP'} = \alpha \vec{OP'}_1 + \beta \vec{OP'}_2 + \gamma \vec{OP'}_3 \quad (4)$$

When $\alpha$, $\beta$ and $\gamma$ are eliminated from (3) and (4), and C', M' and Y' are developed:

$$\begin{pmatrix} C' \\ M' \\ Y' \end{pmatrix} = \begin{pmatrix} C'_1 & C'_2 & C'_3 \\ M'_1 & M'_2 & M'_3 \\ Y'_1 & Y'_2 & Y'_3 \end{pmatrix} \begin{pmatrix} C_1 & C_2 & C_3 \\ M_1 & M_2 & M_3 \\ Y_1 & Y_2 & Y_3 \end{pmatrix}^{-1} \begin{pmatrix} C \\ M \\ Y \end{pmatrix}$$

wherein, when the input value P is on either axis of the C axis, M axis, Y axis or C=M=Y axis, the output value P' is obtained by the linear interpolation using two points, one is the origin, and the other is a representative point at the apex of that axis.

Figure 19:
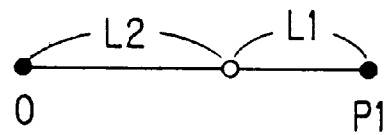
FIG. 19 is a diagram explaining the outline of the linear interpolation on an axis.

For example, as shown in FIG. 19, if it is assumed that the input value P is on a certain axis, and a line connecting the origin 0 and an apex of that axis P1 (C1, M1, Y1) is divided into L2 and L1, the output value P' (C', M', Y') is given by the following expression:

$$\begin{pmatrix} C' \\ M' \\ Y' \end{pmatrix} = \frac{L_2}{L_1 + L_2} \begin{pmatrix} C'_1 \\ M'_1 \\ Y'_1 \end{pmatrix}$$

Furthermore, when the input value P is in the vicinity of the C axis, M axis, Y axis or C=M=Y axis, representative points nearest to the input value are selected by the representative points selecting section 102 among the axis groups, and the linear interpolation is performed in the same manner.

When the input value exists on the CM plane, MY plane or YC plane, the representative points are respectively selected from two axes which are in the vicinity thereof, and the linear interpolation is performed by weighting.

Figure 20:
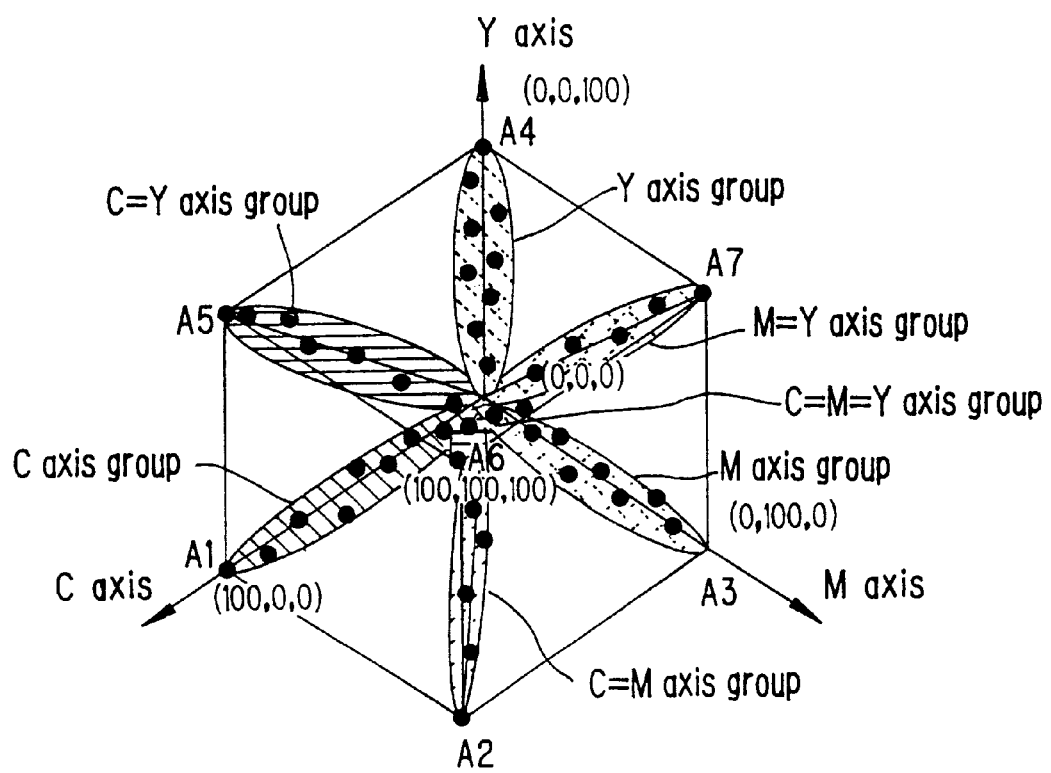
FIG. 20 is a schematic diagram showing the configuration of representative points in the LUT according to the eleventh embodiment.

The eleventh embodiment of the present invention will now be described. The schematic structure of this embodiment is shown in FIG. 16, as in the tenth embodiment, except that the number of axes for arranging representative points in the vicinity of the axis increases. The configuration of representative points in this embodiment is shown in FIG. 20. In FIG. 20, there are added three axis groups for arranging representative points in the vicinity of the axis, as described below, compared to FIG. 17.

That is to say, lines passing through A0–A2, A0–A7, A0–A5 are further set as the axis. In these linear axes, the coordinates (Xa, Xb, Xc) on the line satisfy the condition of Xa=Xb, Xc=0, Xb=Xc, and Xa=0, Xc=Xa, Xb=0. Therefore, hereinafter these linear axes are referred to as C=M axis (Y=0), M=Y axis (C=0), and Y=C axis (M=0).

Representative points are discretely arranged at the endpoints (on eight apexes on the three-dimensional cube) of seven axes of C axis, M axis, Y axis, C=M=Y axis, C=M axis (Y=0), M=Y axis (C=0), and Y=C axis (M=0), and in the vicinity of these seven axes, so that no other representative point exists on a line connecting a certain representative point and the origin. Here, it is assumed that the LUT 103 has the color correction data as shown in FIG. 21, with respect to the respective coordinates of the representative points.

The number of representative points and the configuration spacing are not limited thereto. The color correction data in FIG. 21 is determined according to the properties of devices to which the color conversion of the present invention is applied. The three-dimensional color space is divided into six regions depending upon which axis is included therein, when three axes are taken into account in order of propinquity to the input value and the distance among the seven axes shown in FIG. 20. Each region is a triangular pyramid designating the origin 0 as an apex, and two nearby axes among C axis, M axis, Y axis, C=M axis (Y=0), M=Y axis (C=0), and Y=C axis (M=0), and C=M=Y axis as the three generatrices. This results in triangular pyramids OA1A2A6, OA1A5A6, OA2A3A6, OA3A6A7, OA4A5A6, and OA4A6A7.

The representative points-dispersed axis selecting section 101A in FIG. 16 judges that in which region among the above-mentioned six regions the input value belongs, and when the triangular pyramid belonging thereto is determined, three representative points-dispersed axes to be targeted are determined to select the nearby point. The representative points selecting section 102 selects three points nearest to the input value among these three representative points-dispersed axis groups. For example, if the input color signal has a percentage of (C, M, Y)=(80%, 20%, 30%), the input value is contained in the triangular pyramid OA1A2A6 of FIG. 20, and the nearby axis groups to be targeted will be C axis group, C=M axis group and C=M=Y axis group. Then, from these three nearby axis groups on which representative points are arranged irregularly, a representative point nearest to the input signal value is selected for every axis group, three in total, by the representative points selecting section 102. The representative points are discretely arranged for each axis group, and the distance between the input point and the representative point is determined for every axis group by means of the least squares, and the representative point having the shortest distance is designated as the nearest point in that axis group.

As described above, after three points in the vicinity of the input signal value are selected, the color conversion processing is performed by means of the linear interpolation in the same manner as in the tenth embodiment.

Since the number of axes for arranging representative points in the LUT increases, the color conversion having higher accuracy becomes possible.

Figure 22:
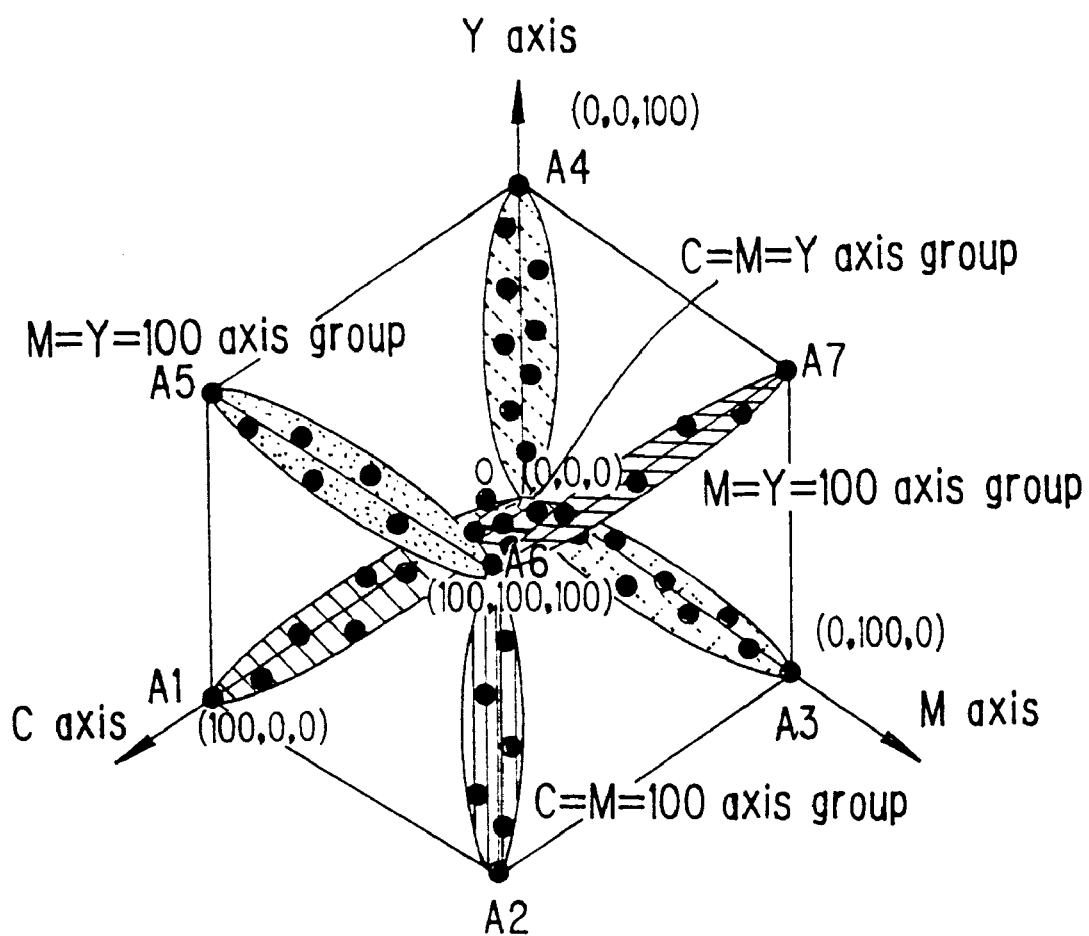
FIG. 22 is a schematic diagram showing the configuration of representative points in the LUT according to the twelfth embodiment.

The twelfth embodiment of the present invention will now be described. The schematic structure of this embodiment is shown in FIG. 16, as in the tenth embodiment, except that the number of axes for arranging representative points are increased. The configuration of representative points in this embodiment is shown in FIG. 22. In FIG. 22, there are added three axes for arranging representative points in the vicinity thereof, compared to FIG. 16.

That is to say, lines passing through A6–A2, A6–A7, A6–A5 are further set as an axis. These linear axes pass the apex A6 of the above-mentioned three-dimensional cube where three components in the coordinates take the largest value, and the coordinates (Xa, Xb, Xc) on the line satisfy the condition of Xa=Xb=100, Xb=Xc=100, and Xc=Xa=

100, respectively. Therefore, hereinafter these linear axes are referred to as C=M=100 axis, M=Y=100 axis, and Y=C=100 axis.

Representative points are discretely arranged as the largest point at the endpoints (on eight apexes on the three-dimensional cube) of seven axes, in which three axes (C=M=100 axis, M=Y=100 axis and Y=C=100 axis) designating a new point A6 (100%, 100%, 100%) as the center and being orthogonal to each other are added, and in the vicinity of these seven axes.

With regard to representative points in the vicinity of these newly added three axes, they are so arranged that no other representative point exists on a line connecting a certain representative point and A6, in respective axis groups within the three-dimensional color space.

Here, it is assumed that the LUT 103 has the color correction data as shown in FIG. 23, with respect to the respective coordinates of the representative points. Moreover, the number of representative points and the configuration spacing are not limited thereto. The color correction data in FIG. 23 is determined according to the properties of devices to which the color conversion of the present invention is applied.

First, three axes which are in the vicinity of the input value are selected by the representative points nearby axis-selecting section 101A. The axis groups in the vicinity of the input value within the three-dimensional color space are divided into six spaces, respectively, according to the size relation of the input value among seven axis groups shown in FIG. 22, and are determined as the generatrix of a triangular pyramid which are divided and contains the input value. For example, when the input color signal has a percentage of (C, M, Y)=(80%, 20%, 30%), the input value is contained in the triangular pyramid OA1A2A6 in FIG. 22, and the nearest axis groups to be targeted become the C axis group, C=M=100 axis group, and C=M=Y axis group. Then, among these three nearest axis groups in which representative points are irregularly arranged, a representative point nearest to the input signal value is selected, respectively, for every axis group, in total three representative points are selected by the representative points selecting section 102. The representative points are discretely arranged for each axis group, and the distance between the input point and the representative point is determined for every axis group by means of the least squares, and the representative point having the shortest distance is designated as the nearest point in that axis group.

As described above, when three representative points in the vicinity of the input signal value are selected, the color conversion is performed by means of the linear interpolation in the same manner as in the tenth embodiment.

In this embodiment, by adding the above-mentioned three axes on which representative points in the LUT are arranged in the vicinity thereof, the accuracy in the color conversion can be improved in a low brightness area.

The thirteenth embodiment of the present invention will now be described. Though the accuracy in the color conversion of an image largely differs depending upon the configuration of representative points, in the tenth embodiment, since C=M=Y axis is always to be selected, by increasing the configuration density of data in the vicinity of the C=M=Y axis, the color conversion with higher accuracy becomes possible.

The fourteenth embodiment of the present invention will now be described. In a region where the brightness is very high, or in a region where the brightness is very low, the human eyes are not so sensitive to the difference of the chroma of colors, hence the conversion accuracy in these brightness regions may be relatively low. Moreover, in the case of natural image, the color data distribution in the three-dimensional color space tends to converge on a relatively medium brightness area. Hence, by arranging more representative points in the medium brightness area in the three-dimensional color space, favorable color conversion becomes possible without increasing the memory volume.

Figure 24:
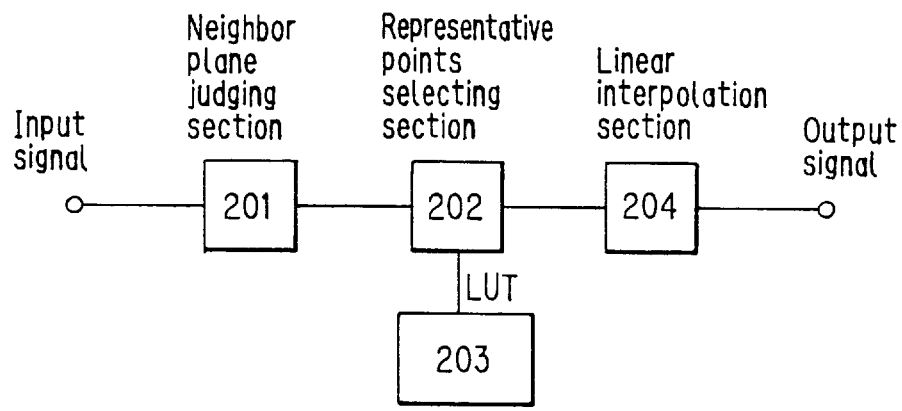
FIG. 24 is a block diagram showing a schematic structure of a color conversion section according to the thirteenth embodiment.

The fifteenth embodiment of the present invention will now be described. FIG. 24 is a block diagram showing a schematic structure of a color conversion section according to the 10th embodiment, which comprises a nearby plane judging section 201 for judging which three planes among six planes constituting a cube in the three-dimensional color space the input value is close to, a representative points selecting section 202 for selecting a representative point one each in the judged three planes which becomes nearest to the input signal value among representative points arranged discretely on the planes, a look-up table (LUT) 203 for storing the coordinates of representative points and the color correction data, and a linear interpolation section 204 for performing the color conversion by weighting based on the selected representative points.

Figure 25:
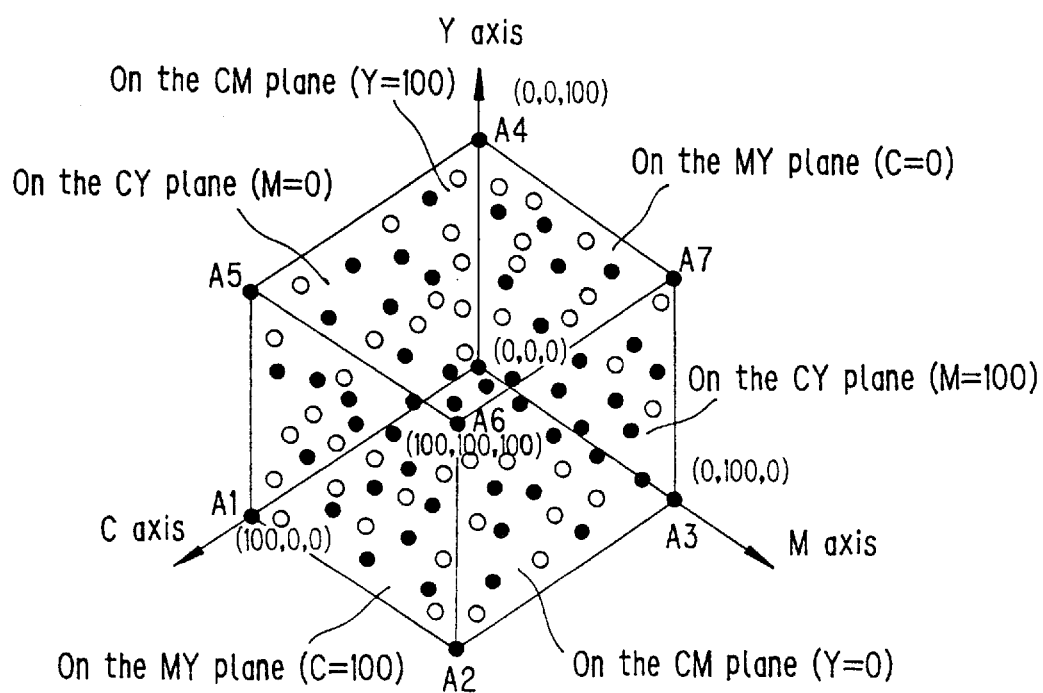
FIG. 25 is a schematic diagram showing the configuration of representative points in the LUT according to the thirteenth embodiment.

FIG. 25 schematically shows the dispersion of representative points. In FIG. 25, representative points are discretely arranged at eight apexes and six planes of the three-dimensional cube.

Here, it is assumed that the LUT 103 has the color correction data as shown in FIG. 26, but the number of representative points and the configuration spacing are not limited thereto. The color correction data in FIG. 26 is to be determined according to the properties of devices to which the color conversion of the present invention is applied.

First, a three-dimensional cube is formed, and three planes which are in the vicinity of the input value are selected according to the size relation of three components of the input value among six planes in which representative points are discretely arranged, by the nearby plane-judging section 201. For example, when the input color signal has a percentage of (C, M, Y)=(60%, 40%, 30%), the input value is in the vicinity of three planes of the CM plane (Y=0), CY plane (M=0) and MY plane (C=100), in FIG. 25. At this time, the plane from which representative points are to be selected are limited to the above-mentioned three planes.

Then, among these three planes in which representative points are irregularly arranged, a representative point nearest to the input signal value is selected one each for every plane, in total three representative points are selected by the representative points selecting section 202. The representative points are discretely arranged on each plane, and the distance between the input point and the representative point is determined for every plane by means of the least squares, and the representative point having the shortest distance is designated as the nearest point in that plane. As described above, a representative point which becomes nearest to the input point is selected one each, in total three, from respective three planes, and the color conversion value is obtained by means of the linear interpolation using these three points in the same manner as in the tenth embodiment.

When the input value P is on either axis of C axis, M axis, Y axis or C=M=Y axis, the output value P' is obtained by means of the linear interpolation using the origin and the apex of that axis, in the same manner as in the tenth embodiment.

With the above-mentioned embodiments, it is confirmed by the subjective evaluation that in the color printer, it is possible to perform the color conversion of the same level as the conventional color conversion with a less volume of operation, which is the characteristic of these embodiments. With these embodiments, the color conversion is not limited to color printers, but can be applied to various input devices and image output devices, for example, in the case of performing the color conversion in scanners and CRT monitors.

As described above, according to the color conversion device of the present invention, representative points are discretely arranged on respective axes in the three-dimensional color space in advance, and the color conversion can be performed with a necessary minimum LUT. Hence, the memory capacity can be reduced, and the color conversion with high accuracy can be performed only by 3×3 matrix operation and with a small LUT, hence the effect of reducing the operation volume and the circuit size is quite noticeable.

Moreover, according to the color conversion device of the present invention, by increasing the number of representative points, the accuracy in the color conversion can be improved.

According to the color conversion device of the present invention, by arranging the representative points up to the high density area, the accuracy in the color conversion can be improved in the high density area.

According to the color conversion device of the present invention, since representative points on the Xa=Xb=Xc axis are always included at the time of region division, by increasing the configuration density of representative points on this axis, the accuracy in the color conversion can be improved.

According to the color conversion device of the present invention, there is no need of arranging representative points with the same spacing on an axis, the configuration of representative points can be freely changed, and representative points in the three-dimensional color space can be arranged, taking the human's visual property into account, hence the look-up table can be used effectively.

Additionally, by partially concentering the configuration of representative points, the color reproducibility can be improved without increasing the memory capacity.

Furthermore, according to the color conversion device of the present invention, users can adjust the hue of the output image according to their preference, by selecting a suitable LUT among a plurality of LUTS.

According to the color conversion device of the present invention, by selecting a LUT having different conversion property depending upon the input image, the color conversion suitable for the properties of the input image can be performed.

According to the color conversion device of the present invention, by newly generating the point data nearest to the input point on the axis from the nearby two representative points on the same axis by means of internal division, the color conversion can be performed with high accuracy.

According to the color conversion device of the present invention, by setting a numerical expression for the color correction instead of the LUT, it is possible not having a memory for the LUT data.

Furthermore, according to the color conversion device of the present invention, by irregularly arranging representative points which store the color correction data in the vicinity of axes in the three-dimensional color space, discontinuity in the color conversion can be eliminated, and the color conversion can be performed with only a necessary minimum LUT, hence reduction of the operation volume and the memory capacity becomes possible.

According to the color conversion device of the present invention, by adding three axes in which representative points in the LUT are arranged in the vinicity of a nearby axis, representative points are arranged up to the low brightness area, hence the accuracy in the color conversion can be improved in the low brightness area.

According to the color conversion device of the present invention, at the time of interpolation, representative points in the vicinity of the Xa=Xb=Xc axis are likely to be selected, and by increasing the configuration density of representative points in the vicinity of this axis, the accuracy in the color conversion can be improved.

According to the color conversion device of the present invention, by arranging more representative points i n the medium brightness area, the color producibility can be improved without increasing the memory capacity.

Furthermore, according to the color conversion device of the present invention, by arranging representative points on a plane, the freedom of configuration of representative points increases, and representative points in the three-dimensional color space can be arranged, taking the human's visual property into account, hence reduction of the operation volume and the memory capacity used for the search of nearby points can be realized, representative points used as a LUT can be easily set, and the look-up table can be used effectively.

What is claimed is:

1. A color conversion device, comprising:

a region judging section for setting N+3 axes in total with three axes orthogonal to each other designating the origin as a center and N lines separately from said three orthogonal axes in a first three-dimensional color space, for arranging a predetermined number of representative points discretely on said N+3 axes, and for discriminating in which region an input color signal value belongs from among a plurality of regions where each arbitrary coordinate on said first three-dimensional color space is divided into a plurality of regions based on a distance to said N+3 axes;

a representative points selecting section for obtaining three representative points by selecting one representative point near said input color signal value on three axes constituting the boundary of said discriminated region;

a look-up table for indicating coordinates on a second three-dimensional color space to which said three representative points are converted to; and an interpolation section for performing color conversion of the input color signal value using said three representative points, thereby converting arbitrary coordinates on said first three-dimensional color space to coordinates on said second three-dimensional color space.

2. The color conversion device according to claim 1, wherein, when coordinates determined by said three orthogonal axes are designated as (Xa, Xb, Xc), one of said N lines which is set separately from said three orthogonal axes is a straight line which satisfies the condition for coordinate defined as Xa=Xb=Xc.

3. The color conversion device according to claim 2, wherein a configuration density of the discrete representative points on the axis satisfying said coordinates Xa=Xb=Xc is increased as compared to configuration densities of other axes.

4. The color conversion device according to claim 1, wherein, when coordinates determined by said three orthogonal axes are designated as (Xa, Xb, Xc), three of said N lines which are set separately from said three orthogonal axes are straight lines which satisfy the condition for coordinates defined as Xa=Xb and Xc=0, Xb=Xc and Xa=0, and Xc=Xa and Xb−0.

5. The color conversion device according to claim 1, further adding, as an axis, three lines passing through coordinates of the largest three components in said first three-dimensional color space said axis forming lines set separately from said three orthogonal axes.

6. The color conversion device according to claim 5, wherein said added three lines are parallel to said three orthogonal ones.

7. The color conversion device according to claim 1, said first three-dimensional color space having low, medium and high density areas, wherein the configuration density is increased in said medium density area as compared to said high and low density areas.

8. The color conversion device according to claim 1, further including:
   a plurality of look-up tables; and
   a look-up table selecting section for enabling a user to select a desired one of said plurality of look-up tables.

9. The color conversion device according to claim 1, further including:
   a plurality of look-up tables; and
   a histogram forming section for reading a color density value of an input image, wherein one of said plurality of look-up tables is automatically selected in accordance with a statistical volume of the input image.

10. The color conversion device according to claim 1, wherein three new representative points are set at a foot of a normal drawn from three axes corresponding to said input color signal value, wherein the axes are selected so that distance from said input color value is found to be in order of propinquity, and wherein coordinates in said second three-dimensional color space to which said new representative points are converted are determined using two representative points arranged on both sides on the same axis as said new representative points.

11. A color conversion device according to claim 1, wherein the look-up table is replaced with a numerical expression set for each axis.

12. The color conversion device according to claim 1, wherein said interpolation section performs color correction with a linear interpolation method using weighting based on said three representative points.

13. A color conversion device, comprising:
   a representative points-dispersed axis selecting section for setting (N+3) axes with three axes orthogonal to each other designating the origin as a center and N lines separate from said three orthogonal axe s in a first three-dimensional color space, for arranging a predetermined number of representative points discretely in the vicinity of said (N+3) axes so that there is no other representative point on a line connecting a certain representative point and the origin, for dividing sets of representative points into groups per unit of each set axis, and for selecting a group of representative points-dispersed axes which are in the vicinity of an input signal value;
   a representative points selecting section for obtaining three representative points by selecting representative points nearest to said input color signal value from each selected representative points-dispersed axis;
   a look-up table for indicating coordinates on a second three-dimensional color space to which said three representative points are converted; and
   an interpolation section for performing color conversion of the input color signal value using said three representative points thereby converting arbitrary coordinates on said first three-dimensional color space to coordinates on second three-dimensional color space.

14. The color conversion device according to claim 13, wherein, when coordinates determined by said three orthogonal axes are designated as (Xa, Xb, Xc), one of said N lines which is set separately from said three orthogonal axes is a straight line which satisfies the condition for coordinates defined as Xa=Xb=Xc.

15. The color conversion device according to claim 14, wherein three of said N lines which are set separately from said three orthogonal axes are straight lines which satisfy condition for coordinate defined as Xa=Xb and Xc=0, Xb=Xc and Xa=0, and Xc=Xa, and Xb=0.

16. The color conversion device according to claim 14, wherein a configuration density of the discrete representative points on the axis satisfying said coordinates Xa=Xb=Xc and in the vicinity of said axis is increased as compared to configuration densities of other axes.

17. The color conversion device according to claim 13, wherein, when coordinates determined by said three orthogonal axes are designated as (Xa, Xb, Xc), three of said N lines which are set separately from said three other orthogonal axes are straight lines which satisfy the condition for coordinates defined as Xa=Xb and Xc=0, Xb=Xc and Xa=0, and Xc=Xa and Xb=0.

18. The color conversion device according to claim 17, wherein three of said N lines which are set separately from said three other orthogonal axes pass through the coordinates where three components of the coordinates in said first three-dimensional color space have the largest value which satisfy the condition defined as Xa=Xb, Xb=Xc and Xc=Xa.

19. The color conversion device according to claim 13, wherein, when coordinates determined by said three orthogonal axes are designated as (Xa, Xb, Xc), three of said N lines which are set separately from said three other orthogonal axes pass through the coordinates where three components of the coordinates in said first three-dimensional color space, have the largest value which satisfy the condition defined as Xa=Xb, Xb=Xc and Xc=Xa.

20. The color conversion device according to claim 13, said first three-dimensional color space having areas of low, medium and high brightness, wherein the configuration density is increased in a medium brightness area.

21. The color conversion device according to claim 13, wherein said interpolation section performs color correction with a linear interpolation method using weighting based on said three representative points.

22. A color conversion device, comprising:
   a nearby plane selecting section for setting three axes orthogonal to each other in a first three-dimensional color space, the origin of said three axes designated as a center, for arranging a predetermined number of representative points discretely on said axes and on six planes forming a three-dimensional cube, and for selecting three of said six planes which are in the vicinity of the input color signal value;
   a representative points selecting section for obtaining three representative points by selecting representative points nearest to said input color signal value from said selected three planes;
   a look-up table for indicating coordinates on a second three-dimensional color space to which said representative points are converted; and
   an interpolation section for performing color conversion of the input color signal value using said three representative points, thereby converting arbitrary coordinates on said first three-dimensional color space to coordinates on said second three-dimensional color space.

23. The color conversion device according to claim 22, wherein said interpolation section performs color correction with a linear interpolation method using weighting based on said three representative points.

24. A color conversion device, comprising:
   a region judging section for setting a total of N+3 axes with at least three axes orthogonal to each other and having a common origin as a center, wherein N lines separately set from said three orthogonal axes in a first three-dimensional color space, for providing a predetermined plurality of discrete representative points on said N+3 axes, and for determining, from a plurality of regions formed from dividing said first three-dimensional color space based on a distance to said N+3 axes, a region containing input color signal value, wherein points nearest said input color signal value are selected as three representative points on three axes constituting the boundary of a discriminated region to be converted as coordinates on a second three-dimensional color space; and an interpolation section for color converting said input color signal value based on said three representative points.

25. The color conversion device of claim 24, further including a look-up table for indicating coordinates on said second three-dimensional color space to which said three representative points are converted and for storing color correction data for color conversion.

26. The color conversion device of claim 24, further including:
a plurality of look-up tables for indicating coordinates on said second three-dimensional color space to which said three representative points are converted, and for storing color correction data; and
a look-up table selecting section for enabling a user to select a desired one of said plurality of look-up tables.

27. The color conversion device of claim 24, further including:
a plurality of look-up tables for indicating coordinates on said second three-dimensional color space to which said three representative points are converted, and for storing color correction data; and
a histogram forming section for reading a color density value of an input image, wherein one of said plurality of look-up tables is automatically selected in accordance with a statistical volume of said input image.

28. The color conversion device of claim 24, wherein, when coordinates determined by said three orthogonal axes are designated as (Xa, Xb, Xc), an axis is set on one of said N lines so as to satisfy the coordinates Xa=Xb=Xc.

29. The color conversion device of claim 28, wherein a configuration density of discrete representative points on said axis satisfying Xa=Xb=Xc is increased as compared to configuration densities of other axes.

30. The color conversion device of claim 24, said first three-dimensional color space further including areas of low, medium and high density color differences, wherein said configuration density is increased in said medium density.

31. The color conversion device according to claim 24, wherein said interpolation section performs color correction with a linear interpolation method using weighting based on said three representative points.

32. A color conversion device, comprising:
a representative points-dispersed axis selecting section for setting a total of N+3 axes with at least three axes orthogonal to each other and having a common origin as a center, wherein N lines separately set from said three orthogonal axes in a first three-dimensional color space, for providing a predetermined plurality of discrete representative points and in the vicinity of said N+3 axes, for dividing sets of representative points into groups and selecting a group of representative points-dispersed axes in the vicinity of an input signal value, wherein points nearest said input color signal value are selected from each of said representative points-dispersed axes as three representative points to be converted as coordinates on a second three-dimensional color space; and an interpolation section for color converting said input color signal value based on said three representative points, thereby converting arbitrary coordinates on said first three-dimensional color space to coordinates on second three-dimensional color space.

33. The color conversion device of claim 32, further including a look-up table for indicating coordinates on said second three-dimensional color space to which said three representative points are converted, and for storing color correction data for color conversion.

34. The color conversion device of claim 32, wherein, when coordinates determined by said three orthogonal axes are designated as (Xa, Xb, Xc), an axis is set on one of said N lines so as to satisfy said coordinates Xa=Xb=Xc.

35. The color conversion device of claim 34, wherein a configuration density of discrete representative points on said axis satisfying Xa=Xb=Xc is increased as compared to configuration densities of other axes.

36. The color conversion device of claim 32, said first three-dimensional color space further including regions of low, medium and high brightness, wherein said configuration density is increased in said medium brightness region.

37. The color conversion device according to claim 32, wherein said interpolation section performs color correction with a linear interpolation method using weighting based on said three representative points.

38. A method of converting color between three-dimensional color spaces, comprising: setting a total of N+3 axes with at least three axes orthogonal to each other and having a common origin as a center, wherein N lines separately set from said three orthogonal axes in a first three-dimensional color space;
providing a predetermined plurality of discrete representative points on said N+3 axes; and
discriminating, from a plurality of regions formed from division of said first three-dimensional color space based on a distance to said N+3 axes, a region containing an input color signal value, wherein points nearest said input color signal value are selected as three representative points on three axes constituting the boundary of a discriminated region to be converted into coordinates on a second three-dimensional color space; and
performing color conversion of said input color signal value based on said three representative points.

39. A method of converting color between three-dimensional color spaces, comprising:
setting a total of N+3 axes with at least three axes orthogonal to each other and having a common origin as a center, wherein N lines separately set from said three orthogonal axes in a first three-dimensional color space;
providing a predetermined plurality of discrete representative points in the vicinity of said N+3 axes;
dividing sets of representative points into groups;
selecting a group of representative points-dispersed axes in the vicinity of an input signal value, wherein points nearest said input color signal value are selected from each of said representative points-dispersed axes as three representative points to be converted as coordinates on a second three-dimensional color space; and
performing color conversion of said input color signal value based on said three representative points, thereby converting arbitrary coordinates on said first three-dimensional color space to coordinates on second three-dimensional color space.

* * * * *